25865

June 23, 1964　　　J. A. RICHARDS　　　3,138,552
MEANS FOR BACKWASHING A FILTER BED

Filed April 18, 1961　　　　　　　　　　　　4 Sheets-Sheet 1

INVENTOR.
JOHN A. RICHARDS

ATTORNEYS

June 23, 1964     J. A. RICHARDS     3,138,552
MEANS FOR BACKWASHING A FILTER BED
Filed April 18, 1961     4 Sheets-Sheet 2
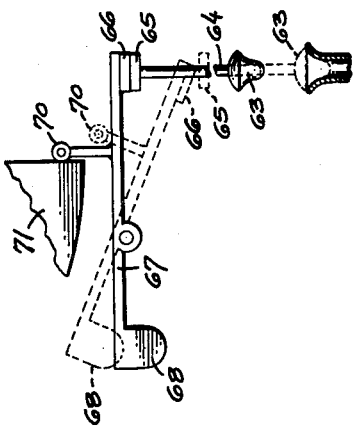
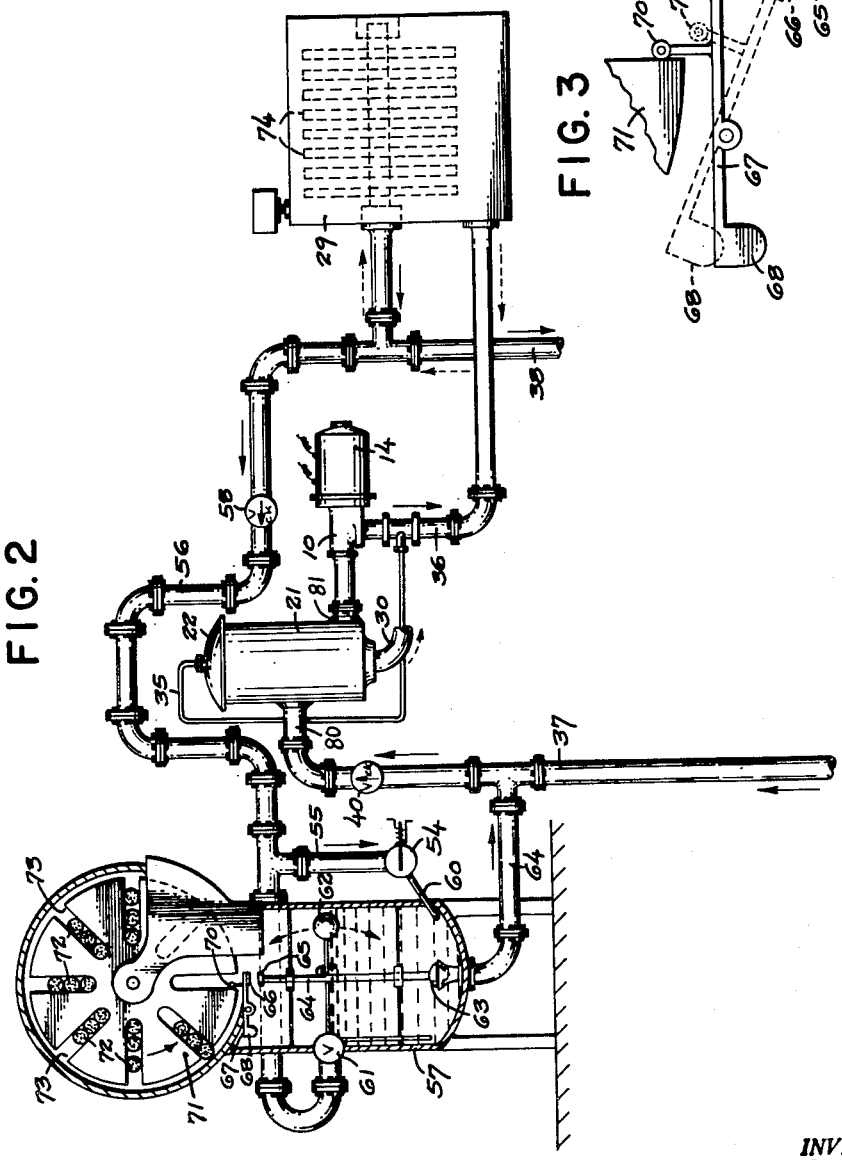
INVENTOR.
JOHN A. RICHARDS
BY
ATTORNEYS

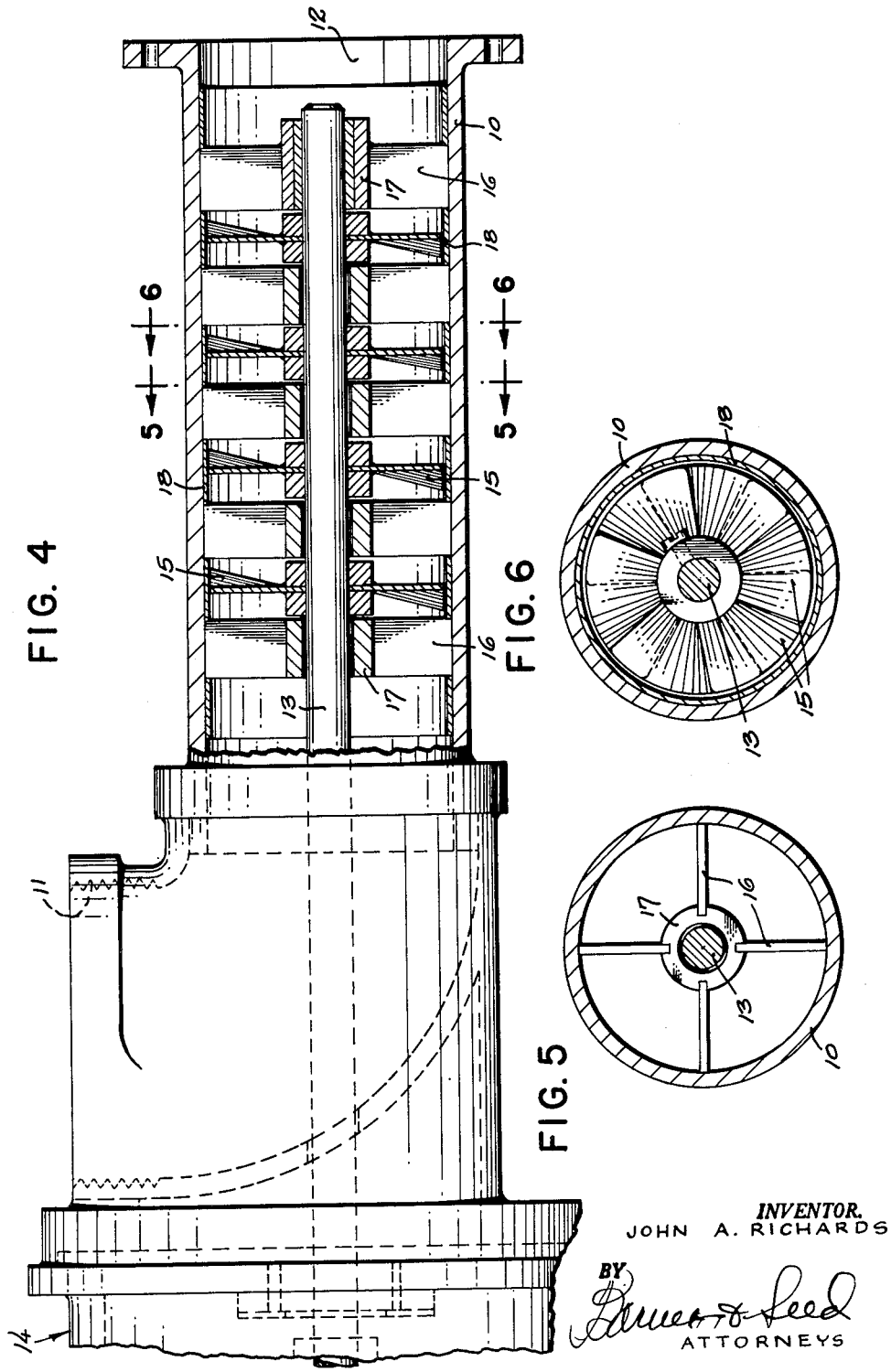

June 23, 1964 J. A. RICHARDS 3,138,552
MEANS FOR BACKWASHING A FILTER BED
Filed April 18, 1961 4 Sheets-Sheet 4

INVENTOR.
JOHN A. RICHARDS
BY
*Barnes & Leel*
ATTORNEYS

# United States Patent Office 3,138,552
Patented June 23, 1964

3,138,552
MEANS FOR BACKWASHING A FILTER BED
John A. Richards, 3525 E. 93rd, Seattle, Wash.
Filed Apr. 18, 1961, Ser. No. 103,947
9 Claims. (Cl. 210—98)

This invention relates to filter systems, and more especially to a means for backwashing the filter beds of filter systems, being applicable to substantially any type of filter bed, D.E. (diatomaceous earth) and sand for example, which relies for its cleaning action upon the establishment of a reverse flow of liquid through the same.

For its principal object the invention aims to provide a means by which the operation of reversing flow so as to obtain the necessary backwashing action is accomplished without the use of valves requiring either manual operation or manual control.

It is a further important object to provide a means for obtaining a back-wash-cleaning of a hair catcher, strainer or other type of trash arrester piped in series with the filter.

The invention has the yet additional object of devising a system in which the backwash operation may be (1) both initiated and terminated by the activation of a hand-operated switch, (2) initiated by such switch and terminated automatically at the expiration of a given time interval, or (3) initiated automatically either at a predetermined time or in response to the development within the system of a predetermined back pressure evidencing need for backwash-cleaning of the filter and then terminated automatically at the expiration of a given time interval.

Other more particular objects and advantages of the invention will, with the foregoing, appear and be understood in the course of the following description and claims, the invention consisting in the novel construction and in the adaptation and combination of parts hereinafter described and claimed.

In the accompanying drawings:

FIGURE 2 is a similar schematic with which is incorporated an arrangement for automatically recoating the filter where the latter is of the type in which the filter media does not admit to re-use after backwashing.

FIGURE 3 is an enlarged-scale fragmentary elevational view detailing a portion of the recoat-control mechanism shown in FIG. 2.

FIGURE 4 is an enlarged scale fragmentary view, partly in longitudinal section and partly in elevation, detailing the advanced pump employed in the present system.

FIGURES 5 and 6 are transverse vertical sectional views drawn on lines 5—5 and 6—6, respectively, of FIGURE 4.

Figure 7:
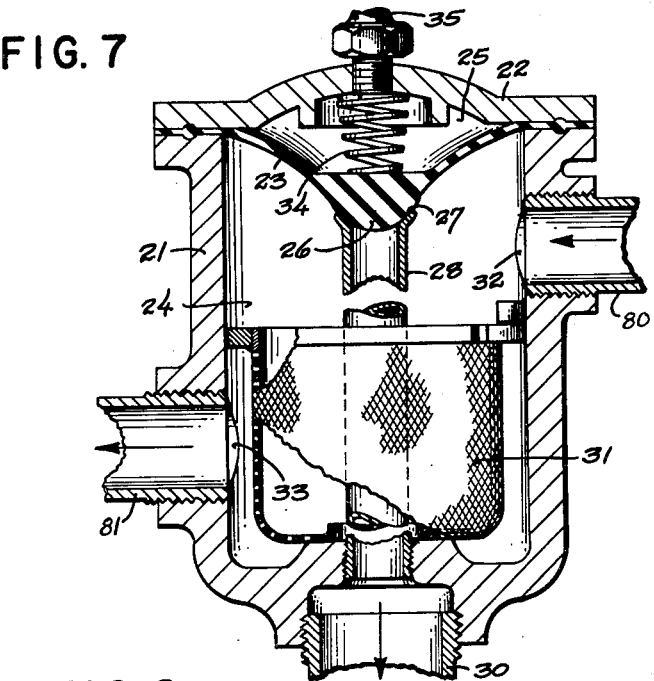
Figure 8:
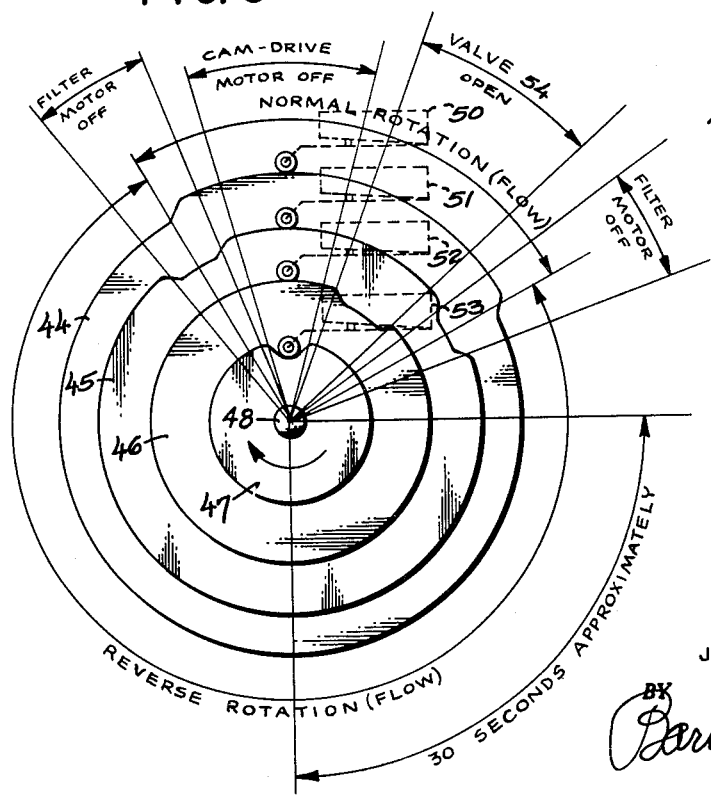
Figure 9:
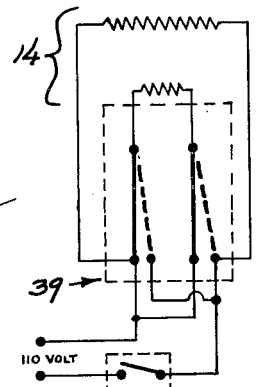

FIGURE 7 is an enlarged-scale vertical sectional view detailing the advanced hair catcher employed in the present system; and FIGURES 8 and 9 are schematic illustrations of the cam arrangement and switch control utilized for either manual, automatic or semi-automatic operation of the system.

Salient to the present invention is the employment of a reversible pump which will operate within the normal head and capacity requirements for normal filtration when operating in normal rotation and which will conform to the normal head and capacity requirements for backwash when operating in reverse rotation. A propeller pump which I find eminently suited for my purposes is detailed in FIGS. 4 through 6, inclusive. A tubular casing 10 is provided having a uniform diameter between two end openings 11 and 12, each of which is capable of becoming the suction (low pressure) side or the discharge (high pressure) side of the pump. A shaft 13 driven from an electric motor 14 extends along the center of an elongated straight portion of the casing. A propeller or series of propellers 15 are attached to the pump shaft, being each so constructed and pitched as to deliver approximately the same volume of water against approximately identical head conditions when rotated in either direction. The propellers are spaced apart at equidistant moderately close intervals and in the spaces therebetween and at each end of the series of propellers a straightening vane unit is introduced. Each vane unit comprises a number of vanes 16 occupying planes radial to the shaft and attached to a hub 17 freely surrounding the shaft. Cylindrical spacers 18 surround the propellers and exert endwise pressure upon the vanes to hold the latter motionless.

Before proceeding with a description of the two systems which I have here elected to show, it is believed that clarity in an understanding of the circuits will be advanced by first describing the perfected hair catcher which the invention employs. From an inspection of FIG. 7 it will be seen that said catcher provides a casing 21 having a quick-release lid 22 which clamps the perimeter of a diaphragm 23. The diaphragm, which divides the interior of the casing into a lower trap chamber 24 and an upper control chamber 25, presents upon its underside a ball valve 26 which seats upon the cupped upper end 27 of an upstanding centrally disposed escape tube 28 leading to a waste pipe 30. A strainer basket 31 surrounds the escape tube, producing a screening separator between an upper inlet opening 32 and a lower outlet opening 33. A spring 34 yieldingly urges the valve 26 against its seat 27.

Figure 1:
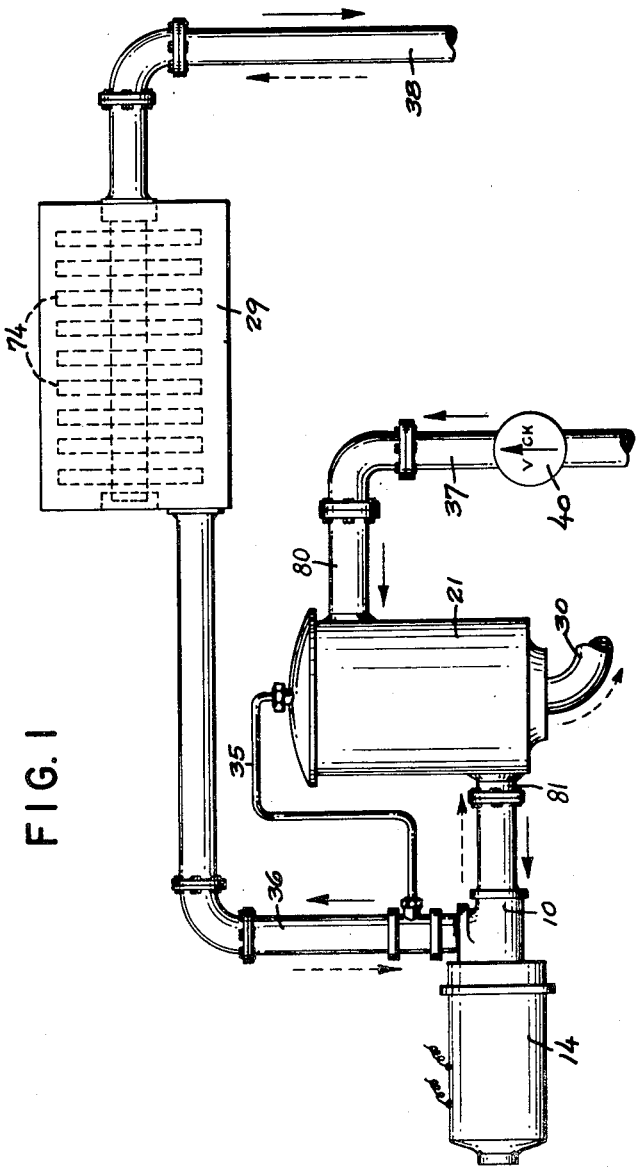
FIGURE 1 is a schematic illustration of a backwash control system constructed to embody the preferred teachings of the present invention.

Referring now to FIGS. 1 and 2, it will be seen that a pipe 35 complements the spring 34 either to augment or reduce, as the case may be, the force load applied upon the valve. Such pipe connects the interior of the control chamber with a flow pipe 36. This flow pipe extends between the normal high pressure side of the reversible pump 10 and the filter tank 29 and handles both the influent to and the effluent from the tank, depending upon whether the latter is performing its normal filtering office or is being backwashed. The other, normally the low pressure, side of the reversible pump connects by a fitting 81 with the outlet opening 33 of the hair catcher. Completing that part of the two illustrated systems common to both are pipes 37 and 38, the former leading by a fitting 80 to the inlet opening 32 from the source of the fluid to be filtered and being equipped with a check valve 40, and the latter extending from the normal discharge opening of the filter tank to said source. The system includes a switch 39 subject either to manual, semi-automatic or automatic control for completing an electric circuit through the reversing motor 14 for the pump.

Tracing the operation of said system as it is illustrated in FIG. 1, and first considering an installation in which the switch 39 is subject to manual control, normal rotation of the pump draws the liquid to be filtered through the hair catcher and thence forces the same through pipe 36 to the filter tank, passing through the filter substance and thence returning by pipe 38 to the source from which the liquid was drawn. Pressure existing within the pipe 36 is carried by pipe 35 to the control chamber 25 of the hair catcher, augmenting the pressure of the spring to maintain valve 26 in a seated condition. When the filter requires backwashing as indicated by pressure or vacuum gauges or other indicating devices the operator manually operates the control switch by first placing the same in "off" position to stop the pump, then moving the switch to "reverse" position. As the pump, now responsively turning in reverse, works against the dead head of the check valve 40, a high pressure develops within the trap chamber 24 to unseat the valve 26, and backwashing liquid now travels in a reverse direction from pipe 38 into the filter tank, thence through pipe 36 and the pump into the lower end of the trap chamber 24, creating a reverse flow through the strainer basket to dislodge such matter as has been collected upon the inner walls of the latter and carrying this matter into the open top of the escape tube 28 and thence by pipe 30 to waste. The inductive force created by the pump within the pipe 36 has now developed a low pressure condition within the control chamber 25 of the hair catcher to complement the force of the flowing liquid in holding the valve 26 unseated. When backwashing is completed the control switch is returned to the position producing normal rotation of the pump and an opposite direction of flow occurs with check valve 40 opening and diaphragm valve 26 closing. Should the concerned filter be of that type which relies upon the deposit of a replacement coating of an expendable filter media, the latter may be manually replaced after backwashing by means of a surface skimmer, strainer or other means, or such may be performed automatically as will be later described.

Proceeding now to describe that part of the system portrayed in FIG. 2, not heretofore considered, its purpose is to add filter media following backwashing of that type of filter in which replacement of a coating is called for.

After backwashing, and the pump has been returned by the hereinafter-described cam shown in FIG. 8 to the direction of rotation which produces normal "filtering" flow, a solenoid valve 54 is caused to be energized and acts to open a normally closed fluid line 55 leading off from a pipe 56 connecting with the outflow pipe 38 of filter tank 29. Both the pipe 55 and a separate branch from the pipe 56 lead to a slurry tank, namely a tank in which a finely powdered filter substance, such as diatomaceous earth, is mixed with water 57. The connection to the tank from said pipe 55 is by a jet tube 60 having as its function to agitate the slurry. The connection to the tank from said separate branch is by a valved outlet. The valve 61 for this outlet permits only a moderate inflow of water and is controlled by a float 62 which is raised or lowered by changing levels of the liquid within the slurry tank. Upon rising to a predetermined level above that which closes valve 61, in consequence of the liquid entering the tank past the opened valve 54, the rod by which said float is carried is brought to bear against a shoulder formed on a vertical rod 64 and responsively unseats a stopper 63 which normally closes an outlet leading by a branch pipe 64 to the inflow pipe 37. When the lowered liquid level of the slurry no longer supports the unseated stopper, the latter closes allowing the level of the liquid to rise until the float 62 closes the valve 61. During the described cycle, said vertical rod 64 to which the stopper is attached is subjected to vertical travel. When raised to its highest position a magnet 65 upon the head end of such rod engages a ferrous metal toe 66 carried upon one end of a lever 67 fulcrumed to swing about a center axis. The other end of said lever is weighted, as at 68. When rod 64 drops, it momentarily draws the toe 66 downwardly before the counter-weight 68 breaks the magnetic attraction, during which interval a stop pin 70 is disengaged from a drum 71 and allows the latter to turn by force of gravity from the off-center weight of pellets 72 occupying radial pockets 73 of the drum. The pellets are composed of compressed filter media. The radial pockets are equidistantly spaced about the perimeter. In initially charging the drum two adjacent bottom pockets are left empty so that the drum, balanced in the absence of pellets, will turn by gravity. As the drum turns one notch, so to speak, so that a filled pocket takes the place of an empty pocket at the bottom of the drum, being thus brought into register with the open top of the slurry chamber, the contents of the pocket is released into the chamber. The stop pin 70 and toe 66 lie to one side of the drop path of the pellets so as not to interfere therewith. The contents of a single said pocket, here shown as three pellets, is sufficient to properly coat the filter elements 74 of the filter for one cycle of filter operation.

Now considering the cam structure portrayed in FIG. 8, there are provided four cams 44, 45, 46 and 47. A motor-driven arbor 48 is common to all of these cams so that the same turn in concert. The motor (not shown) for this arbor may be started either manually or automatically by a momentary switch (not shown). The automatic activation may be made to respond to time or a rise of pressure within the system to a predetermined level, this being common practice with existing systems. When the arbor responsively starts to turn, the cam 47 closes a switch 53 which takes over from the momentary switch and continues to supply current to the cam-drive motor until the arbor has completed one revolution, whereupon cam 47 opens the switch 53. Cam 46, which operates through a switch 52 to energize and de-energize the solenoid control for the valve 54, acts to open said valve for a given short interval of time during the closing period of said cycle. Cam 44 acts upon a switch 50 which responsively operates by magnetism to place the blades of switch 39 alternately in two circuit-closing positions, one of which causes the motor 14 to turn in one direction and the other of which causes the motor to turn in the other direction. An "on-off" switch 51 for the filter motor 14 is controlled by cam 45, producing dwell periods of short duration during which such filter motor is off, the purpose being to permit the pump to come to a stop before changing direction. The entire cycle is or may be timed for a duration of two minutes.

It is believed that the invention and the manner of its operation will have been clearly understood from the foregoing detailed description of the now-preferred illustrated embodiment. Changes in details of construction can be resorted to without departing from the spirit of the invention and it is accordingly my intention that no limitations be implied and that the hereto annexed claims be given the broadest interpretation to which the employed language fairly admits.

What I claim is:

1. In combination with a chamber having inlet and outlet openings separated by a filter bed, a source of liquid, a reversible pump having openings which serve interchangeably as inlet and outlet depending upon the direction in which said reversible pump is driven, a conduit between said liquid source and the side of said pump which normally operates as the inlet or suction side, a conduit between the inlet opening of the chamber and the other or normal outlet or pressure side of the pump, a conduit between the outlet opening of the chamber and the liquid source, a normally isolated waste conduit, and means operated automatically by the act of reversing said pump, so as to backwash the filter bed, serving to coincidently bring the then discharge side of the pump into communication with the waste conduit and isolating said discharge side from the liquid source, said pump being of the propeller type comprised of multiple inline propeller blades occupying a tubular casing of substantially uniform diameter throughout its length and driven in opposite directions of rotation, selectively, and having the several blades separated one from another by stationary straightener vanes.

2. Structure according to claim 1 in which the filter bed is comprised of filter members faced with a replaceable layer of filter media, and means operating automatically including the act of returning said pump to its normal direction of rotation, following the described backwashing, for charging fresh filter media into the suction stream of liquid.

3. Structure according to claim 1 in which the filter bed is comprised of filter members faced with a replaceable layer of filter media, and means operating automatically including the act of returning said pump to its normal direction of rotation, following the described backwashing, for introducing a slurry of fresh filter media into the suction stream of liquid, the media content of said slurry being predetermined.

4. In combination with a chamber containing a filter bed comprised of filter members faced with a replaceable layer of filter media, means for pumping liquid through said chamber in either of two opposite directions selectively so as to in the one instance filter the pumped liquid and in the other instance backwash the filter bed, and means made to operate including the act of so changing the direction of pumping as to terminate a backwashing operation and initiate a normal filtering action for automatically charging a slurry of fresh filter media of predetermined media content into the pumped stream which is to be filtered.

5. The structure recited in claim 4 in which the media content of the slurry is comprised of disintegrated pellets of compressed media.

6. In combination with a pool of liquid which is to be screened and filtered: a hair catching screen, a filter, a waste conduit, and alternatively operated means for either drawing liquid from the pool and pumping the same through the screen, the filter, and then returning the same back to the pool, or drawing liquid from the pool and pumping the same in a reverse direction first passing through the filter to backwash the latter and then traversing the screen before discharging into the waste conduit.

7. Structure according to claim 6 in which the hair catching screen comprises a screening basket fitting the interior of a closed housing in an intervening position between two openings one of which feeds from the pool to the interior of the basket and the other of which leads between the exterior of the basket and a reversible pump which performs the pumping function of the system, a connection from the interior of the basket to the waste conduit fitted with a normally closed valve, the connection from the pool to the closed housing being fitted with a normally open valve, the valves being of such a nature that the act of reversing said pump so as to force liquid from the pump into the closed housing automatically closes the last-named valve and opens the first-named valve.

8. Structure according to claim 7 in which the closing and opening of the last-named valve results in part from pressure differentials obtaining between the suction and discharge sides of the pump.

9. The system of claim 6 having clock-operated cams for actuating said alternatively operated means in timed sequence.

References Cited in the file of this patent

UNITED STATES PATENTS

| | | |
|---|---|---|
| 738,244 | Roth | Sept. 8, 1903 |
| 2,066,479 | MacIsaac | Jan. 5, 1937 |
| 2,260,169 | Couch | Oct. 21, 1941 |
| 2,455,130 | Lomax | Nov. 30, 1948 |
| 2,570,131 | Koupal | Oct. 2, 1951 |
| 2,878,938 | Dee | Mar. 24, 1959 |
| 3,057,478 | Price | Oct. 9, 1962 |
| 3,061,100 | Fehlmann | Oct. 30, 1962 |
| 3,064,816 | Griswold | Nov. 20, 1962 |